Patented Nov. 23, 1937

2,100,256

UNITED STATES PATENT OFFICE 2,100,256

METHOD OF MAKING COMPOSITE BODIES OF ZINC AND ALUMINUM

Clayton E. Larson, Louisville, Ky., assignor to Reynolds Metals Company, New York, N. Y., a corporation of Delaware No Drawing. Application February 8, 1936, Serial No. 63,030

4 Claims. (Cl. 29—189)

This invention relates to the production of composite bodies of zinc and aluminum.

The desirability of producing laminated bodies of zinc and aluminum has long been recognized, many of the important advantages to be secured by the use of such laminated metal being set out in the patent to Franz Jordan, No. 1,985,784, of December 25, 1934, and various proposals have heretofore been made as to methods for producing the same, chiefly by rolling sheets of zinc and aluminum into close mechanical adherence, sometimes at an elevated temperature so as to effect some dispersion between the metals. The high surface tension, tenacity and resistance to rupture of the aluminum oxide film, which is inevitably present when aluminum is exposed to the air, render difficult the effecting of a uniform mechanical adhesion of zinc to aluminum under mechanical pressure, even though the temperature of one or both of the metals may be raised so as to render the metals relatively soft. Furthermore, even though the temperature of the metals be raised so as to facilitate dispersion between the metals as a concomitant of the establishment of high pressure between the metals, as by rolling, it is very difficult if possible to so control the dispersion as to obtain either uniformity of bond or controlled depth of bond between the metals. Therefore, so far as I am aware, no commercially feasible procedure has heretofore been suggested for rolling zinc and aluminum into a laminated structure so as to produce a substantially uniform bond between the laminations.

It is an object of this invention to produce laminated zinc and aluminum by a procedure involving rolling which assures a substantially uniform bond throughout the contiguous surfaces of the laminations.

Another object of this invention is to provide a method for producing laminated bodies of aluminum and zinc by a rolling procedure wherein the depth of the bond connecting the laminations may be controlled so as to secure a predetermined depth as well as a substantially uniform character of bond.

Another object of this invention is to provide a method of the type characterized which is of such character that it may be efficiently and economically performed in large scale commercial operations.

Another object of this invention is to produce plates, sheets, foils, and other bodies of aluminum coated zinc wherein a substantially uniform bond throughout the contiguous surfaces of the aluminum and zinc is obtained by first forming an alloy bonding layer of predetermined character and depth on the surface of the aluminum and then establishing a mechanical adherence of a zinc body thereto by rolling pressure.

Another object of this invention is to produce a method of uniting aluminum and zinc laminae by pressure to effect a bond therebetween which is not destroyed during subsequent working operations on the laminated metal, to the end that the laminated metal so formed may be readily drawn, pressed, shaped, rolled, and otherwise worked, and applied to a wide variety of uses because of its inherent ductility, malleability, pliability, extensibility, etc.

Another object of this invention is to produce a method of the type just characterized which establishes a uniform bond of predetermined thickness throughout the contiguous surfaces of the laminations without interfering with or detracting from the characteristics to be desirably obtained from the association of aluminum and zinc into a laminated structure.

Other objects will appear as the description of the invention proceeds.

In conformity with the present invention a composite body of aluminum and zinc is formed by first creating a thin layer of alloy at the surface of the aluminum, said alloy being formed under such conditions as to secure a substantially uniform character and depth thereof throughout the surface of the aluminum which is to be united to the zinc, and then rolling said alloy later into intimate mechanical adhesion to a zinc body to establish a continuous and substantially uniform bond therebetween.

For most purposes it is preferable to have the coating metal substantially coextensive with the outer face of the ultimate product, but it is within the contemplation of the present invention to provide an aluminum coating on one face only of a zinc core, and therefore the term "coating" as herein used is to be interpreted as embracing a covering on one or more faces of the zinc core. The laminated metal to be formed as hereinafter described may take a wide variety of forms such as blocks, billets, plates, sheets, bands, etc. For purposes of illustrating the invention, however, it will be assumed that the composite metal is to be formed as a slab appropriate for subsequent rolling operations and having a coating of aluminum that is coextensive with the opposed faces of the zinc core thereof.

The preferred procedure is as follows:—Aluminum in a form to provide the coating is first selected. The thickness of the coating may be varied within relatively wide limits depending upon the use to which the composite metal is to be put, and the desired characteristics of the ultimate product, etc. Thus having regard for the percentage of aluminum to zinc desired in the finished product the coating may vary from a few thousandths of an inch in thickness up to practically any thickness of aluminum that can be properly handled, in conjunction with the thickness of zinc core selected, during the succeeding working operations. The aluminum coating is preferably formed from hot rolled sheet aluminum, as this provides an envelope which is well annealed and has a relatively clean surface. However, cold rolled aluminum sheets may be employed if preferred, provided the sheets are sufficiently annealed and the surface thereof is properly cleaned to enable the carrying out of the process as herein described.

The face of each sheet which is to be united to the zinc is then provided with a substantially uniform aluminum alloy layer of predetermined depth, zinc being preferably used because of the facility with which a bond may be effected under pressure between a zinc aluminum alloy and the zinc core. The preferred procedure is to heat the aluminum sheet to a temperature at least as high as the eutectic melting point of the aluminum zinc binary system. Zinc is then applied to the face of the aluminum sheet which is to be united with the core in such a way as to assure a uniform breakdown and detachment of the aluminum oxide film from the aluminum sheet and to obtain a uniform layer of alloy of desired depth. To this end the aluminum sheet may first be treated with zinc chloride or any other suitable flux that will break down the aluminum oxide, but I prefer to use abrasion of the aluminum surface, as with any suitable wire brush, after molten zinc, which may be melted by the temperature of the aluminum plate, has been spread over the surface of the aluminum so that it is applied uniformly thereover, working the brush through the coating of molten zinc to break down the oxide film while the zinc coating protects the aluminum surface from contact with the oxygen of the air. This procedure also avoids the presence of foreign material that may have to be removed to avoid interference with the establishment of a uniform bond between the zinc and the alloy layer during the subsequent operations to be described.

The depth of the alloy formed can be varied depending upon the temperature of the aluminum and the time and character of the chemical or mechanical work which are used in breaking down the aluminum oxide film and assuring a penetration of the zinc into the aluminum. Ordinarily, a relatively thin layer of alloy is desired, deep penetration of the zinc into the aluminum being undesirable because the alloy is less ductile than either the aluminum or the zinc. The zinc goes into solution with the aluminum and establishes a zinc aluminum alloy which is substantially uniform in thickness, and of controlled thickness throughout the surface of the aluminum sheet, and as the alloy does not have a tough tenacious oxide film in the presence of air the alloy coated aluminum so produced is in condition for effecting adhesion under pressure to a zinc core.

The slab of zinc having its surfaces properly cleaned and of any suitable thickness depending upon the desired characteristics, contemplated use, desired percentage of aluminum to zinc, etc., is then assembled with a pair of aluminum sheets provided with thin alloy layers as above described, with the alloy layers thereof in contact with the zinc core, and the laminations are then rolled into intimate mechanical adhesion under any suitable pressure and at any suitable temperature. Under the pressure of the rolling operation, the zinc core and the alloy layer of the aluminum coating, in the course of the metal flow incident to the rolling operation, are coalesced at their contacting faces, establishing a bond by the interlocking of the crystals of the alloy and zinc, which bond is substantially uniform, continuous and coextensive with the contacting faces of the alloy and core. The rolling operation may be carried out at any suitable temperature, an elevated temperature being preferred so as to avoid undue strain hardening of the component metals. The temperature of rolling, however, should not be so high as to produce an undesirable or undue penetration of the zinc aluminum alloy into the coating and core metals because of the lesser ductility of the alloy, but within these limitations the composite metal may be rolled at temperatures approaching the annealing temperature of the aluminum, on the one hand, or at any suitable lower temperature down to cold rolling where characteristics derived from cold working are desired, on the other hand.

Aluminum coated zinc slabs, blocks, plates, sheets, foils, etc., of any suitable thickness may thus be formed for fabrication into a wide variety of articles, and the composite metal may be subjected to drawing, spinning, pressing, and other mechanical operations without destroying the bond between the laminations.

The coating may be composed of pure aluminum or a wide variety of aluminum base alloys, depending upon the character of the coating desired, and the core may be composed of pure zinc or of any suitable zinc alloy. Ordinarily, for economy in the use of scrap, the core is preferably a zinc base alloy with a small percentage of aluminum therein, the presence of the aluminum also giving desirable characteristics to the core metal. Therefore, it is to be expressly understood that when aluminum or zinc are referred to herein it is intended to embrace within such terms any suitable alloy of aluminum for the coating metal and any suitable alloy of zinc for the core metal.

The present invention therefore provides bodies of aluminum coated zinc wherein the zinc and aluminum are united by rolling with the assurance that a uniform bond of predetermined depth is established between their contiguous surfaces. The composite metal is possessed of various desirable characteristics inherent in the use of aluminum as a coating metal and zinc as a core metal without detracting from their respective characteristics by the manner in which the composite metal is formed. The method of the present invention also is one that can be readily carried out in large scale operations. Therefore, the composite metal of the present invention, because of the characteristics inherent therein as a result of its manner of production, may be put to a wide variety of uses. Because of its ductility, malleability, capacity for reduction and extension, etc., a wide variety of regular and irregular shapes may be formed therefrom, while the metal may be readily drawn, rolled or otherwise worked into a wide variety of fabricated articles, including very thin foils, and applied to many uses in the electrical, mechanical and chemical arts.

While the preferred procedure has been described with considerable particularity, it is to be expressly understood that the invention is not restricted thereto, as various departures therefrom will now suggest themselves to those skilled in the art. For example, other methods of securing the alloy layer may be used, and any other suitable metal such as tin may be used for effecting the alloy layer, provided an alloy bond with the aluminum is established as herein disclosed, so as to break through and remove the oxide film from the aluminum and establish a thin alloy layer which protects the surface of the aluminum, and which under rolling pressure can be united with a zinc core or a suitable alloy formed thereon so as to obtain a substantially uniform and permanent adherence thereto. The method of this invention may also be employed in uniting other laminations of diverse metals than aluminum and zinc. Reference is therefore to be had to the claims hereto appended for a definition of the limits of the invention.

What is claimed is:—

1. The method of forming malleable and ductile aluminum coated zinc having an aluminum zinc bond of relatively thin and substantially uniform and predetermined thickness which does not penetrate to the surface of the aluminum, said method including the steps of forming on the surface of an aluminum coating sheet a relatively thin layer of zinc aluminum alloy while breaking down the aluminum oxide film at the surface of the aluminum and controlling the thickness of said alloy layer by the temperature of the metal and the amount of work applied thereto, and then causing cohesion of the zinc of said layer to the zinc core metal by rolling the coating and core metals together under a pressure that causes interlocking of the contacting zinc faces and under a temperature that leaves the zinc aluminum alloy of substantially its original thickness whereby the resulting bond remains relatively thin and of predetermined thickness and the laminated metal is malleable and ductile.

2. The method of forming malleable and ductile aluminum coated zinc having an aluminum zinc bond of relatively thin and substantially uniform and predetermined thickness which does not penetrate to the surface of the aluminum, said method including the steps of forming on the surface of an aluminum coating sheet a relatively thin layer of zinc aluminum alloy while breaking down the aluminum oxide film at the surface of the aluminum and controlling the thickness of said alloy layer by the temperature of the metal and the amount of work applied thereto, and then causing cohesion of the zinc of said layer to the zinc core metal by rolling the coating and core metals together under a pressure that causes interlocking of the contacting zinc faces and at a temperature which does not exceed the annealing temperature of the aluminum coating sheet whereby further dispersion of the zinc into the aluminum is largely avoided and the relatively thin alloy bond of predetermined thickness existing between the core metal and the coating metal leaves the laminated metal malleable and ductile.

3. The method of forming malleable and ductile aluminum coated zinc having an aluminum zinc bond of relatively thin and substantially uniform and predetermined thickness which does not penetrate to the surface of the aluminum, said method including the steps of applying molten zinc to the face of an aluminum coating sheet while breaking down the aluminum oxide film at the surface of the aluminum to form a relatively thin layer of zinc aluminum alloy therebetween and controlling the thickness of said alloy layer by the temperature of the metal and the amount of work applied thereto, and then causing cohesion of the zinc of said layer to the zinc core metal by rolling the coating and core metals together under a pressure that causes interlocking of the contacting zinc faces and under a temperature that leaves the zinc aluminum alloy of substantially its original thickness whereby the resulting bond remains relatively thin and of predetermined thickness and the laminated metal is malleable and ductile.

4. The method of forming malleable and ductile aluminum coated zinc having an aluminum zinc bond of relatively thin and substantially uniform and predetermined thickness which does not penetrate to the surface of the aluminum, said method including the steps of forming on the surface of an aluminum coating sheet a relatively thin layer of zinc aluminum alloy while breaking down the aluminum oxide film at the surface of the aluminum and controlling the thickness of said alloy layer by the temperature of the metal and the amount of work applied thereto, and then causing cohesion of the zinc of said layer to the zinc core metal by rolling the coating and core metals together under a pressure that causes interlocking of the contacting zinc faces and under a temperature that leaves the zinc aluminum alloy of substantially its original thickness whereby the resulting bond remains relatively thin and of predetermined thickness and the laminated metal is malleable and ductile, and thereafter working said laminated metal to reduce the cross section thereof without disrupting said bond.

CLAYTON E. LARSON.